US00RE46812E

(19) United States
(12) Reissued Patent
Sohn et al.

(10) Patent Number: US RE46,812 E
(45) Date of Reissued Patent: May 1, 2018

(54) PORTABLE COMPUTER

(71) Applicant: Samsung Electronics Co., Ltd., Suwon-si (KR)

(72) Inventors: Donghoon Sohn, Seoul (KR); Anders P. Jensen, Charlottenlund (DK)

(73) Assignee: SAMSUNG ELECTRONICS CO., LTD., Suwon-si (KR)

(21) Appl. No.: 29/581,288

(22) Filed: Oct. 18, 2016

Related U.S. Patent Documents

Reissue of:
(64) Patent No.: Des. 723,540
Issued: Mar. 3, 2015
Appl. No.: 29/473,116
Filed: Nov. 19, 2013

(30) Foreign Application Priority Data

May 30, 2013 (KR) ..... 30-2013-0028189

(51) LOC (11) Cl. ..... 14-02
(52) U.S. Cl.
USPC ..... D14/315
(58) Field of Classification Search
USPC ..... D14/315–327; D18/2, 7, 11
CPC ... G06F 1/166; H04M 1/0214; H04M 1/0216; H04M 1/0237
See application file for complete search history.

(56) References Cited

U.S. PATENT DOCUMENTS 5,987,704 A 11/1999 Tang
6,223,393 B1 5/2001 Knopf
6,421,235 B2 7/2002 Ditzik
6,480,373 B1 * 11/2002 Landry et al. ..... 361/679.06
D488,807 S * 4/2004 Ogasawara ..... D14/318
(Continued)

*Primary Examiner* — Phillip S Hyder
(74) *Attorney, Agent, or Firm* — McAndrews Held & Malloy, Ltd.

(57) CLAIM

The ornamental design for a portable computer, as shown and described.

DESCRIPTION

*Notice: More than one reissue application has been filed for the reissue of U.S. Pat. No. D723,540. The reissue applications are application Nos. 29/556,105, which is an application for reissue of U.S. Pat. No. D723,540; 29/556,459 and 29/556,468, which are each a continuation reissue of application Ser. No. 29/556,105; and 29/581,288, which is a divisional reissue of application Ser. No. 29/556,105.*

FIG. 1 is a top front perspective view of a portable computer showing our new design;
FIG. 2 is a front view thereof;
FIG. 3 is a rear view thereof;
FIG. 4 is a [side] *left-side* view thereof;
FIG. 5 is [another side] *a right-side* view thereof;
FIG. 6 is a top view thereof;
FIG. 7 is a bottom view thereof; and,
FIG. 8 is another top front *perspective* view thereof, with the portable computer shown in an open position.

[The broken lines illustrating portions of the portable computer are for environmental purposes only and form no part of the claimed design.]

*The broken lines in the drawings illustrate portions of the portable computer that form no part of the claimed design.*

1 Claim, 4 Drawing Sheets

Figure 1:
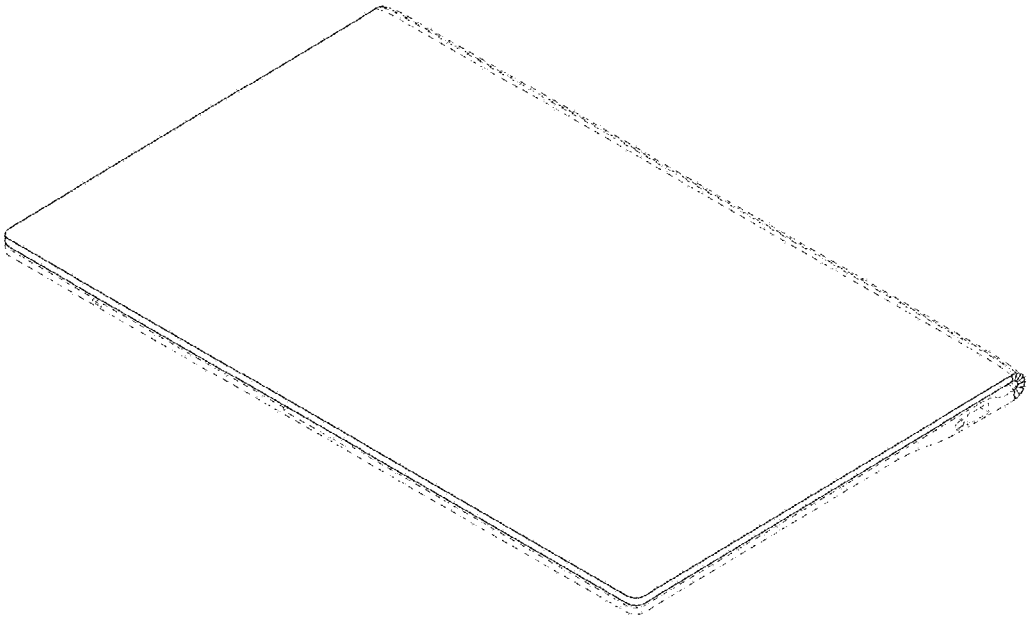
Figure 2:
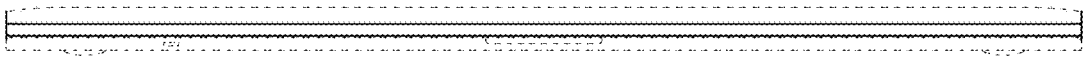
Figure 3:
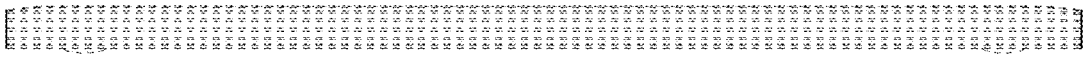
Figure 4:
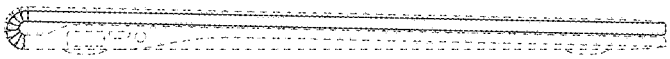
Figure 5:
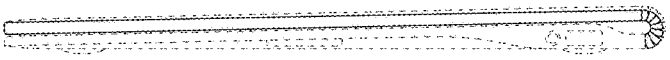
Figure 6:
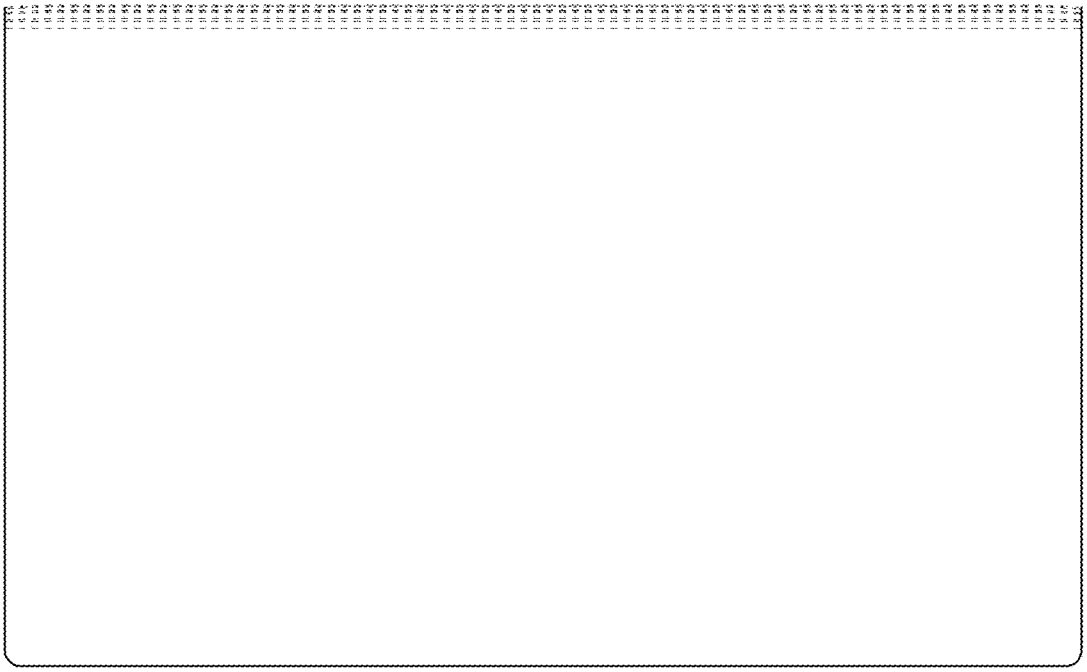
Figure 7:
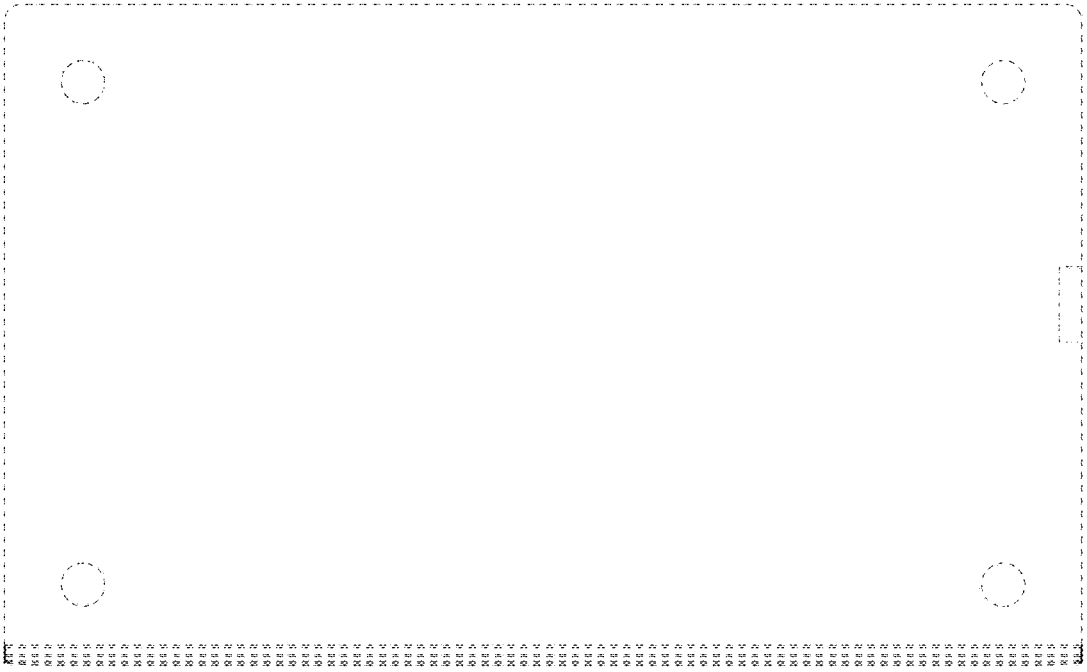
Figure 8:
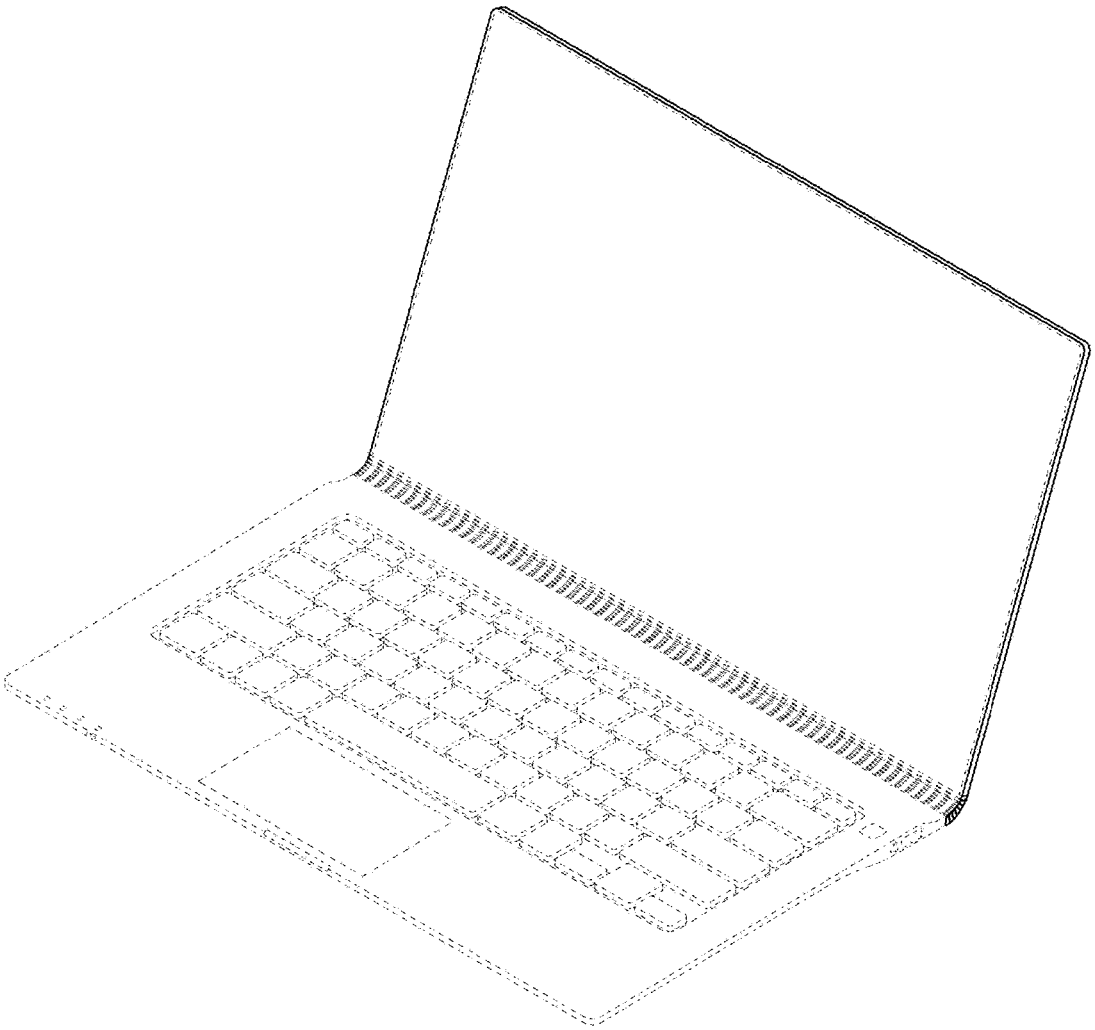

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| D551,640 | S | | 9/2007 | Wolf |
| D591,283 | S | * | 4/2009 | Luminosu et al. ..... D14/318 |
| 7,532,916 | B2 | | 5/2009 | Lee |
| 8,170,630 | B2 | | 5/2012 | Murayama |
| 8,194,399 | B2 | | 6/2012 | Ashcraft |
| D664,753 | S | | 8/2012 | Santos |
| D664,953 | S | | 8/2012 | Hung |
| D675,199 | S | * | 1/2013 | Wen et al. ..... D14/315 |
| D682,818 | S | | 5/2013 | Morisawa |
| D705,221 | S | | 5/2014 | Hong |
| 2006/0002068 | A1 | | 1/2006 | Kim |
| 2007/0117600 | A1 | | 5/2007 | Robertson, Jr. |
| 2008/0300031 | A1 | | 12/2008 | Cho |
| 2010/0232100 | A1 | | 9/2010 | Fukuma |

* cited by examiner